United States Patent [19]

Morikawa et al.

[11] Patent Number: 5,145,039

[45] Date of Patent: Sep. 8, 1992

[54] DAMPER FILLED WITH OIL

[75] Inventors: Kiyoshi Morikawa; Atsushi Kurokawa; Sei Onishi; Kiyohito Kajihara; Kaoru Takemasa; Osamu Kitazawa, all of Saitama, Japan

[73] Assignee: Pioneer Electronic Corporation, Tokyo, Japan

[21] Appl. No.: 617,129

[22] Filed: Nov. 21, 1990

[30] Foreign Application Priority Data

Feb. 16, 1990 [JP] Japan ............................. 2-35455
Feb. 16, 1990 [JP] Japan ............................. 2-35456

[51] Int. Cl.$^5$ ............................. F16F 9/00
[52] U.S. Cl. ............................. 188/298; 267/121; 267/140.11
[58] Field of Search ............... 188/298; 267/140.1 A, 267/140.1 R, 140.1 C, 219, 121; 180/300, 312, 902; 248/562, 636

[56] References Cited

U.S. PATENT DOCUMENTS

| | | | |
|---|---|---|---|
| 3,168,278 | 2/1965 | Ogden | 188/298 |
| 3,375,908 | 4/1968 | Chaput et al. | 188/298 |
| 4,342,884 | 8/1982 | Ban et al. | 188/298 |
| 4,422,779 | 12/1983 | Hamaekers et al. | 267/140.1 |
| 4,589,638 | 5/1986 | Hofmann et al. | 267/219 |
| 4,645,188 | 2/1987 | Jordens | 248/562 |
| 4,726,573 | 2/1988 | Hamaekers | 180/300 |
| 4,754,956 | 7/1988 | Barone et al. | 248/562 |
| 4,817,925 | 4/1989 | Sprang et al. | 248/562 |
| 4,836,512 | 6/1989 | Lun | 248/562 |
| 4,854,560 | 8/1989 | Lun | 267/219 |
| 4,893,797 | 1/1990 | Le Fol et al. | 180/300 |
| 4,905,956 | 3/1990 | Zemlicka et al. | 248/636 |
| 4,909,490 | 3/1990 | de Fontenay | 180/312 |

Primary Examiner—Sherman Basinger
Assistant Examiner—Anne E. Bidwell
Attorney, Agent, or Firm—Nikaido, Marmelstein, Murray & Oram

[57] ABSTRACT

A damper has a cylindrical body having a flexible plate portion. The body is inserted into a cylindrical holder. The outer periphery of the body is secured to the holder with an adhesive so as to restrict deformation of the body caused by movement of a rod to be engaged with the flexible plate portion.

3 Claims, 5 Drawing Sheets

DAMPER FILLED WITH OIL

BACKGROUND OF THE INVENTION

The present invention relates to a damper provided between a suspended device and an outer casing thereof for preventing the suspended device from receiving unexpected shock.

An audio device such as a home CD player is designed so as to be horizontally disposed. However, a car CD player is disposed horizontally or vertically depending on the space for arranging the player.

The inventors of the present invention have proposed a CD player where a pickup normally operates either in the vertical disposition or the lateral disposition of the player. For example, Japanese Patent Application 1-109666 discloses such a CD player which is shown in FIG. 9.

Referring to FIG. 9, a car CD player 1 comprises an outer casing 2 and an inner casing 3 mounted in the casing 2. The inner casing 3 is supported in the casing 2 through a pair of springs 11 provided between each of the longitudinal inner sides 2a of the casing 2 and opposing outer sides 3a of the inner casing 3. Dampers 4 are provided between the outer casing 2 and the inner casing 3 at the four corners. Each damper 4 is charged with viscous oil such as a silicon oil. A supporting rod 4a provided at one end of the damper 4 is connected to a support plate 3b formed at each corner of the inner casing 3. The other end of the damper 4 is connected to the outer casing 2.

In one lateral side of the inner casing 3 is formed with an opening 5 through which a magazine M is inserted therein. The magazine M has a plurality of vertically layered trays t each of which holds a compact disk D. When the magazine M is inserted in the inner casing 3 through the opening 5, a selected tray t is moved to a playback position shown in the figure through a loading mechanism. The disk D is thereafter rotated at a predetermined speed so that information written on the disk D is read out by a pickup 30.

The CD player 1 is horizontally disposed as shown in FIG. 9, or vertically disposed in an upright position by rotating the player about a lateral axis 90 degrees and mounted in a trunk of a motor vehicle. The CD player 1 is operated through an operation panel provided in the interior of the vehicle to play the required disks D.

The lower end of each spring 11 is rotabably mounted on a support pin 10 secured on the side 3a. The upper end of the spring is rotatably mounted on a lobe 12a of a rotational disk 12 which is parallel with the side 2a and rotatably mounted on the side 2a of the inner wall of the outer casing 2 through a pin 13 at the center thereof. Each disk 12 has a pair of arcuated slits 14 and 15 formed symmetrically with respect to the pin 13. Each slit 14, 15 extends across an angle of 90 degrees Guide pins 16 and 17 secured to the sides 2a engage with the slits 14 and 15, respectively The springs 11 in cooperation with the dampers 4 absorb the shocks and vibrations of the vehicle when it is driven.

When mounting the CD player 1 in the upright position, the four rotational disks 12 on the sides 2a are rotated 90 degrees in the counterclockwise direction. Thus, the springs 11 extend in the vertical direction, thereby vertically suspending the inner casing 3.

As shown in FIG. 10, the conventional damper 4 provided between the outer and inner casings 2 and 3 comprises a flexible damper body a made of soft rubber, a cylindrical holder c made of hard rubber wherein the body a is inserted, viscous oil b trapped inside the body a, and a support rod e engaged in a recess d at an end thereof. The other end of the rod e is connected to the inner casing 3. When the rod e vibrates, the oil b is agitated, thereby absorbing the vibration.

However, when a large outer force caused by a shock or vibration is exerted on the damper rod e, the rod e deflects downwardly as shown in FIG. 11. As a result, a gap f is formed between the holder c and the upper periphery of the body a, and the recess d moves toward the lower periphery of the body. Hence the quantity of oil between the lower periphery of the body a and the recess d decreases so that the agitation of the viscous oil is restricted. Consequently, shocks and vibrations cannot be sufficiently absorbed, causing harm to the suspended device, or in the case of a reproducing device, causing noises.

SUMMARY OF THE INVENTION

The object of the present invention is to provide a damper where external force applied thereto is sufficiently absorbed, thereby preventing the device suspended by the damper from receiving unexpected shocks and vibrations.

According to the present invention, there is provided a damper comprising, a cylindrical body having a flexible plate portion and filled with oil, a base of the body being to be secured to a supporting member and the flexible plate portion being to be engaged with a rod for suspending a device, holding means secured to the body, the holding means being arranged to restrict deformation of the body caused by movement of the rod.

In an aspect of the invention, the holding means comprises a cylindrical holder and an adhesive applied to an outer periphery of the body and an inner wall of the holder.

In another aspect of the invention, the holding means comprises a flange formed on a periphery of the body, a cylindrical holder having a flange to be engaged with the flange of the body, and a ring engaging both the flanges with each other.

The other objects and features of this invention will become understood from the following description with reference to the accompanying drawings.

DETAILED DESCRIPTION OF THE PREFERRED EMBODIMENTS

Figure 1:
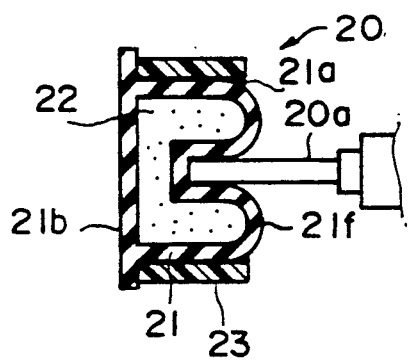
FIG. 1 is a sectional view of a damper according to the present invention.
Figure 2:
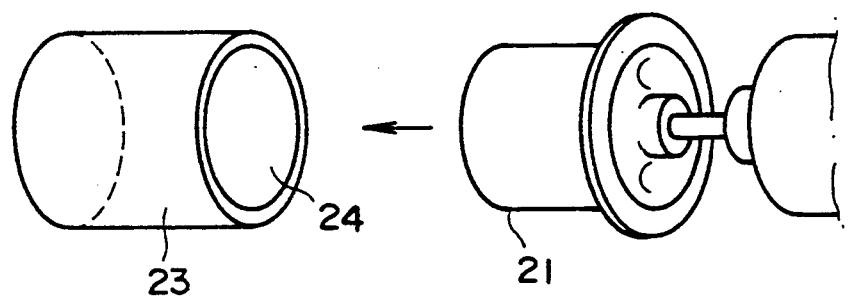
FIGS. 2 and 3 are exploded perspective views showing the modifications of the damper shown in FIG. 1.

Referring to FIGS. 1 and 2, a damper 20 according to the present invention comprises a cylindrical damper body 21 mad of soft rubber and charged with viscous oil 22, a cylindrical holder 23 made of hard rubber for holding the body 21, and a rod 20a connected to a suspended inner casing of a device to which the damper is applied. The body 21 has a flexible plate portion 21f. A base 21b of the body 21 is connected to an outer casing of the device The body 21 is fixed in the holder 23 through an adhesive The body may be adhered to the holder 23 only along a shoulder of the body 21 by an adhesive 21a if the adherence is sufficient. Alternatively, the whole periphery of the body 21 contacting the inner wall of the holder 23 may be adhered to ensure the adherence Any commercially sold resinous adhesive may be used as the adhesive. The holder 23 may be made of another material such as metal and synthetic resin as long as the material has sufficient rigidity.

Thus, the damper body 21 and the holder 23 are joined together. Therefore, even though the rod 20a is shifted by an external force, the flexible plate portion 21f of the body 21 contacting the rod 20a slackens at one side behind the moved rod and tightens at the advance side of the rod without forming a gap between the body 21 and the holder 23. Thus, the shape of the inner space of the body 21 does not change much, thereby allowing the viscous oil 21 charged therein to flow.

Shock and vibration which are transmitted to the damper 20 through the base 21b are absorbed through the agitation of the oil 22 and the elasticity of the body 21. Hence, only a small external force is transmitted to the inner suspended casing, hardly affecting the operation of a device housed therein.

As shown in FIG. 2, showing a modification of the damper 20, a double-faced adhesive tape 24 is attached on the inner wall of the holder 23. The body 21 is then inserted in the holder 23, thereby attaching the body 21 and the holder 23 with each other through the adhesive tape 24.

Figure 3:
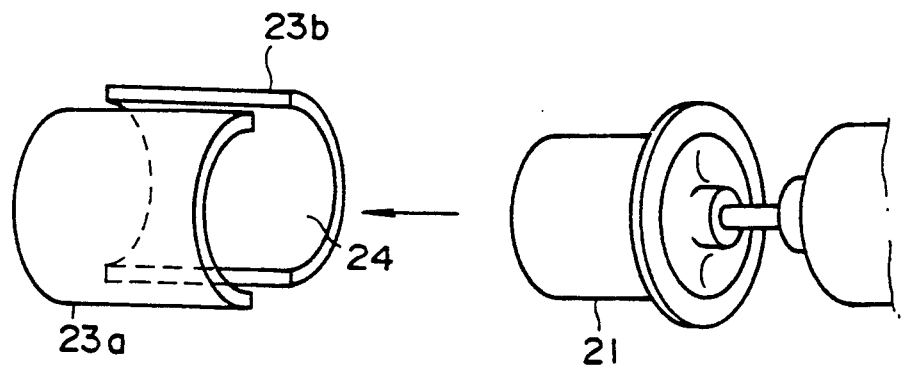

In the second modification of the present invention shown in FIG. 3, the holder 23 is divided into two parts 23a and 23b, each having the adhesive tape 24 adhered to the inner wall thereof Thus, the holder 23 is easily mounted on the body 21.

Figure 4:
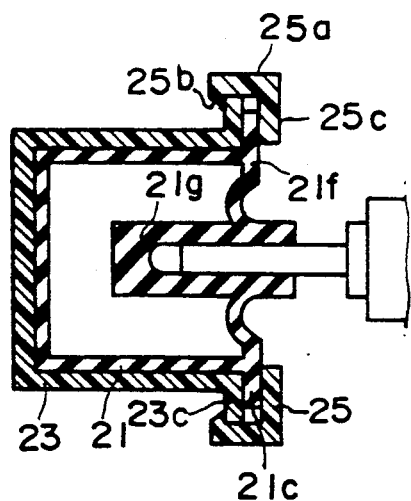
FIGS. 4 to 6 are sectional views of other embodiments of the damper according to the present invention.

Referring to FIG. 4 showing the second embodiment of the present invention, the body 21 is mechanically fitted in the holder 23. The flexible plate portion 21f has a cylindrical holding portion 21g in which the rod 20a is engaged. The body 21 has a flange 21c and the holder 23 has a flange 23c. The flange 21c and 23c are held together by an annular elastic metal ring 25. The ring 25 has a plurality of legs 25a each having a pawl 25b at the end. The pawls 25b engage with the flange 23c of the holder 23 while a flat annular portion 25c of the ring 25 is pressed against the flange 21c of the body 21. Thus, the shoulder of the body 21 is fixed to the inner wall of the holder 23.

Figure 5:
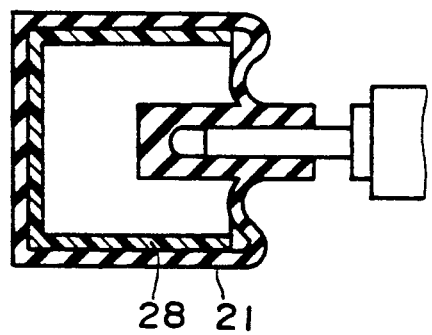

Referring to FIG. 5, the damper body 21 of the third embodiment of the present invention has a rigid cylinder 28 fitted within, thereby maintaining the shape of the body 21. The rigidity of the cylinder maintains the shape of the body 21 although a force exerted on the body 21 urges to change its shape. Hence, the body 21 is kept constantly in contact with the inner wall of the holder 23.

Figure 6:
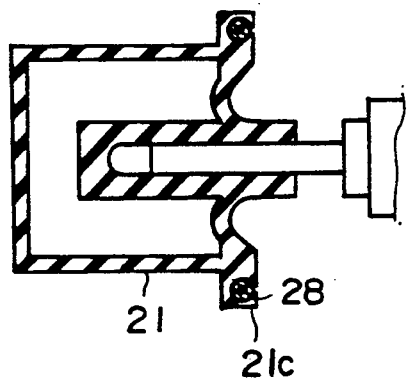

FIG. 6 shows the fourth embodiment of the present invention where an annular ring 28 is embedded in or adhered to the flange 21c of the body 21, thereby maintaining the shape of the body 21.

The damper of the present invention may be further modified. For example, a plurality of projections made of relatively hard rubber is formed on the outer periphery of the damper body 21 and a plurality of holes each of which engages with the projections is formed in the inner wall of the holder 23. By engaging the projections with the holes, the body 21 and the holder 23 are connected with each other. Alternatively, in order to attach the body to the holder, a hardening element may be filled in a space between the body 21 and the holder 23 instead of using adhesive.

Figure 7:
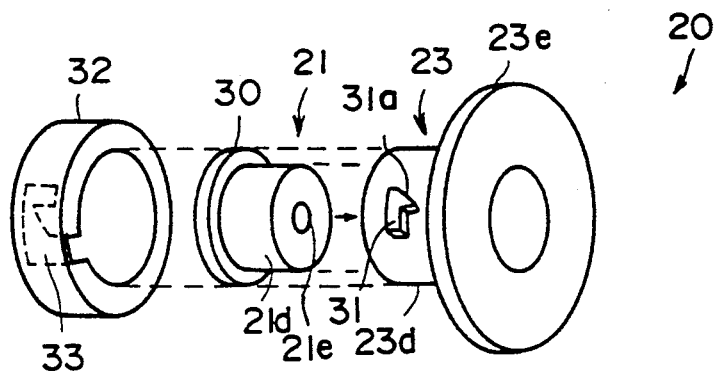
FIG. 7 is an exploded view of the damper of a fifth embodiment of the present invention.

Referring to FIG. 7 showing the fifth embodiment, the damper 20 has a flange 30 integrally formed with the body 21. The flange 30 may be made of a relatively rigid material and attached to the damper body 21. A hole 21e wherein the supporting rod 20a is inserted is formed in a cylindrical portion 21d of the body 21 on the opposite side of the flange 30.

The holder 23 comprises a cylindrical portion 23d and a flange 23e. A projection 31 having a hook 31a is provided on the periphery of the cylindrical portion 23d. The axial length of the holder 23 including the cylindrical portion 23d and the flange 23e is the same or slightly longer than that of the cylindrical portion 21d of the body 21. The inner diameter of the cylindrical portion 23d is substantially the same as the diameter of the cylindrical portion 21d.

Figure 8:
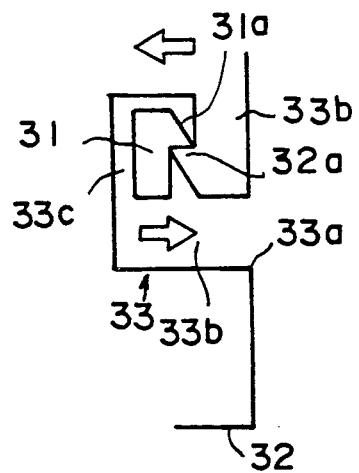
FIG. 8 is a diagram showing an engaging mechanism between a cap and a holder of the damper of the fifth embodiment.
Figure 9:
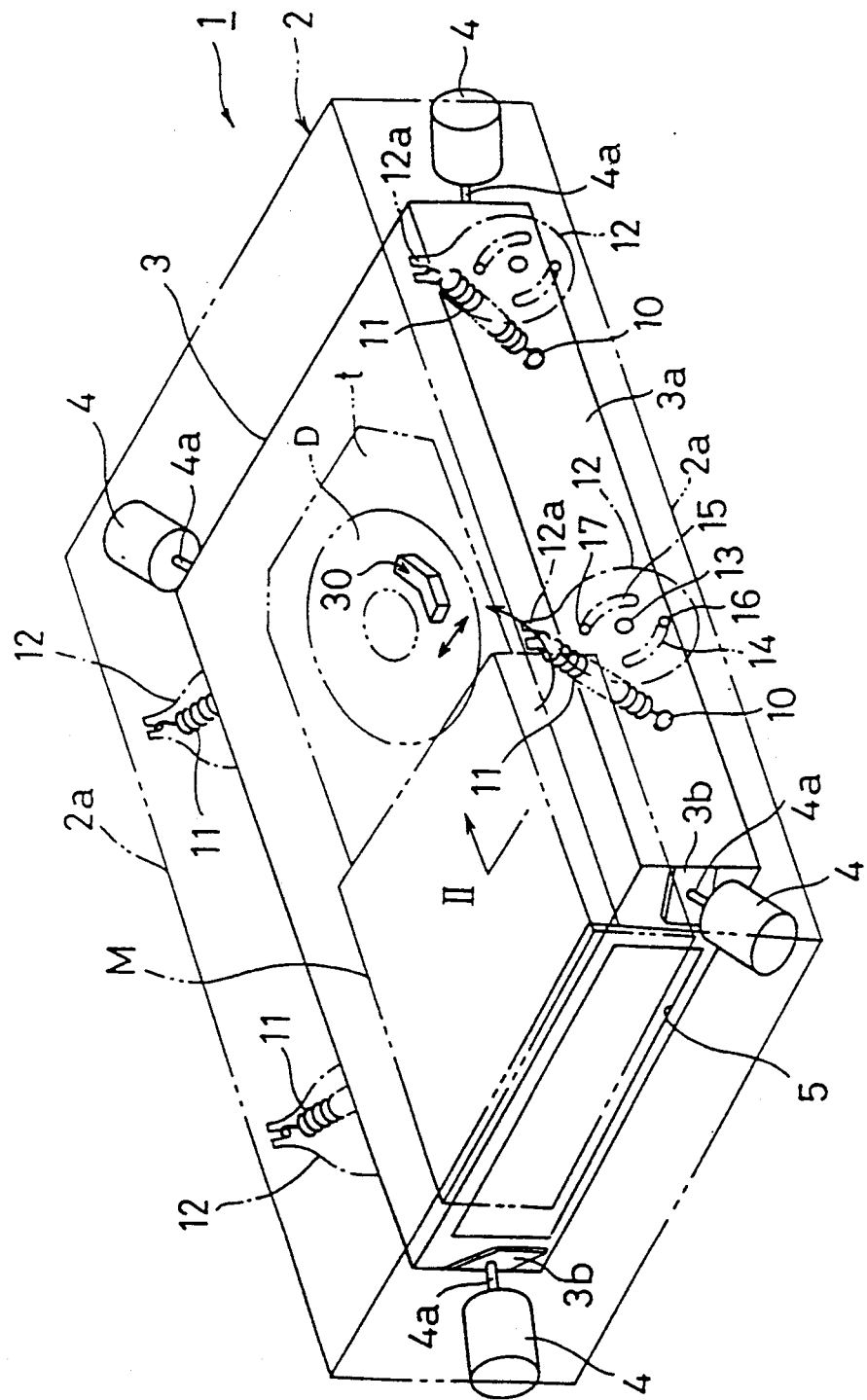
FIG. 9 is a perspective view of a CD player as an example of a device in which the dampers of the present invention are applied.
Figure 10:
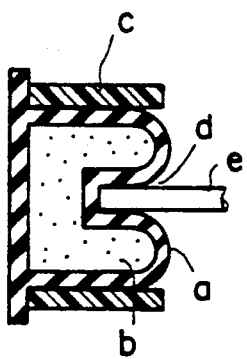
FIG. 10 is a sectional view of a conventional damper.
Figure 11:
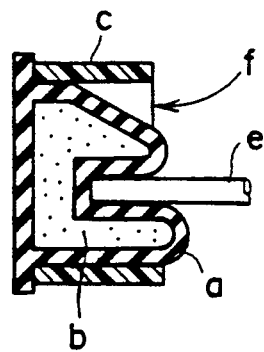
FIG. 11 is a sectional view showing the operation of the damper shown in FIG. 10.

A cap 32 having an inner diameter which corresponds to the diameter of the cylindrical portion 23d of the holder 23 is further provided to cover the cylindrical portion 23d of the holder 23. The cap 32 is made of a rigid hard rubber, same as the holder 23, or of a relatively softer material In an inner periphery of the cap 32, a groove 33 in which the projection 31 of the holder 23 engages is formed As shown in FIG. 8, the groove 33 has an opening 33a formed on the inner edge of the cap 32, axial guide groove 33b and a circumferential groove 33c perpendicular to the guide groove 33b. A tongue 32b having a hook 32a overlooking the groove 33c is formed on the inner wall of the cap 32.

The distance between the flange 23e and the bottom of the cap 32 when the hooks 31a and 32 are engaged is slightly shorter than the axial length of the body 21 including the flange 30.

In order to assemble the damper 20, the damper body 21 is inserted in the cylindrical portion 23d of the holder 23 until the flange 30 engages the bottom of the cylindrical portion 23d. The cap 33 is positioned so as to confront the opening 33a of the groove 33 with the projection 31 of the holder 23. The holder 23 is inserted in the cap 32 so that the projection 31 slides in the guide groove 33b of the groove 33. Thereafter, the cap 32 is rotated thereby engaging the hook 32a with the hook 31a as shown in FIG. 8. Thus, the cap 32 is mounted on the holder 23.

In such an engaging state, the flange 30 is pressed between the cylindrical portion 23d of the holder 23 and the bottom surface of the cap 32. Namely, the body 21 is held in a predetermined position so that the relative positions of the hole 21e and the holder does not change. Moreover, when the flange 30 is pressed, reaction forces are exerted on the holder 23 and the cap 32.

The reaction forces act in opposite directions, urging the holder 23 and the cap 32 to move away from each other. Consequently, the engaging force of the hooks 31a and 32a of the holder 23 and the cap 33 increases so that the engagement cannot be easily released.

The damper 20 thus assembled is mounted in a hole formed in the outer case 2, from the outside or the inside, by applying adhesive on the surface of the flange 23e of the holder 23. Alternatively, the damper may be mounted with screws. Since the relative positions of the body and the holder do not change, the damper 20 can be easily mounted.

When replacing the damper body 21, the cap 32 is pressed against the holder 23 and turned. Thus, the engagement between the hooks 31a and 32a is released so that the cap 32 can be pulled off the holder 23, enabling to take out the body 21a.

From the foregoing it will be understood that the present invention provides a damper for a device having a suspended construction where the shape of the damper body charged with viscous oil does not change despite the external force applied thereto. Thus, the flow of the viscous oil can be maintained, thereby absorbing shocks and vibrations. As a result, if the damper is applied to a sound reproduction device, noises due to the shocks and vibrations are prevented and the service life thereof is elongated.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A damper comprising:

hollow, sealed cylindrical body of relatively soft, elastic material filled with viscous oil having an integral flexible plate portion at one end of said cylindrical body and an integral base at the other end of said cylindrical body for securing said body to a support member, said flexible plate portion being engageable with a rod for suspending a device;

holding means of relatively hard, rigid material adhesively secured to said cylindrical body intermediate said flexible plate portion and said base to hold the entire cylindrical body;

said flexible plate portion having a recess indented into an inside portion of said cylindrical body;

said rod being engaged with said recess so that lateral movement of the rod is damped by said flexible plate portion.

2. The damper according to claim 1 wherein said holding means comprises a cylindrical holder adhesively attached to an outer periphery of said body, said adhesive being applied between an outer periphery of said body and an inner wall of said holder.

3. The damper according to claim 1 wherein said flexible plate portion has a cylindrical portion for holding one end of said rod.

* * * * *

UNITED STATES PATENT AND TRADEMARK OFFICE
CERTIFICATE OF CORRECTION

PATENT NO. : 5,145,039

DATED : September 8, 1992

INVENTOR(S) : Morikawa et al

It is certified that error appears in the above-identified patent and that said Letters Patent is hereby corrected as shown below:

On the Title page, item [75],
Please correct the surname of the second inventor from "KUROKAWA" to --KUROSAWA--.

Signed and Sealed this

Ninth Day of November, 1993

Attest:

BRUCE LEHMAN

Attesting Officer

Commissioner of Patents and Trademarks